(12) United States Patent
Schmidt et al.

(10) Patent No.: US 8,365,901 B2
(45) Date of Patent: Feb. 5, 2013

(54) CONVEYOR PAN WITH CHANGEABLE TROUGH, AND A CHANGEABLE TROUGH

(75) Inventors: Siegfried Schmidt, Bottrop (DE); Jorg Wirtz, Witten (DE)

(73) Assignee: Caterpillar Global Mining Europe GmbH (DE)

(*) Notice: Subject to any disclaimer, the term of this patent is extended or adjusted under 35 U.S.C. 154(b) by 164 days.

(21) Appl. No.: 13/060,074

(22) PCT Filed: Aug. 28, 2009

(86) PCT No.: PCT/IB2009/053770
§ 371 (c)(1),
(2), (4) Date: Feb. 22, 2011

(87) PCT Pub. No.: WO2010/023637
PCT Pub. Date: Mar. 4, 2010

(65) Prior Publication Data
US 2011/0139587 A1    Jun. 16, 2011

(30) Foreign Application Priority Data
Aug. 29, 2008    (DE) .................... 20 2008 011 518 U

(51) Int. Cl.
*B65G 19/28*    (2006.01)
(52) U.S. Cl. ................................. 198/735.6
(58) Field of Classification Search ..... 198/735.1–735.6
See application file for complete search history.

(56) References Cited

U.S. PATENT DOCUMENTS

| | | | |
|---|---|---|---|
| 3,842,966 A * | 10/1974 | Blumenthal et al. ....... | 198/735.1 |
| 4,643,296 A * | 2/1987 | Braun et al. ............... | 198/735.4 |
| 4,667,811 A | 5/1987 | Schoop et al. | |
| 4,735,304 A * | 4/1988 | Schoop et al. ............. | 198/735.3 |
| 4,787,501 A * | 11/1988 | Rassmann et al. ......... | 198/735.2 |
| 4,842,128 A * | 6/1989 | Tomlinson ................. | 198/735.4 |
| 5,938,000 A * | 8/1999 | Fischer et al. ............. | 198/735.4 |
| 6,896,121 B2 * | 5/2005 | Vorsteher et al. .......... | 198/735.2 |
| 6,966,426 B1 * | 11/2005 | Sobczak et al. ............ | 198/465.3 |

FOREIGN PATENT DOCUMENTS

DE    297 08 613 U1    7/1997

* cited by examiner

*Primary Examiner* — Mark A Deuble
(74) *Attorney, Agent, or Firm* — Foley & Lardner LLP

(57) ABSTRACT

A conveyor pan for a mining conveyor having a substructure with two side elements and an intermediate floor as well as a changeable trough forming a top strand and being detachably and exchangeably fastenable to the substructure. The trough having side profiles, each with a top web, and the top strand fastening means including screw bolts being fixable in place on the substructure. In order to ease an exchange of the trough, at least the top web of one side profile is provided with a plurality of open-edged indentations, in which there are welded holding strips, which project laterally over the top web and are provided with a plurality of bolt holes for the passage of a plurality of screw bolts.

20 Claims, 4 Drawing Sheets

CONVEYOR PAN WITH CHANGEABLE TROUGH, AND A CHANGEABLE TROUGH

The invention relates to a conveyor pan for a mining apparatus, in particular an underground scraper chain conveyor in the form of a face conveyor or gate conveyor, comprising a substructure having two side elements, which are joined together by means of an intermediate floor and/or a bottom strand floor and define a bottom strand, and further comprising a changeable trough, which forms a top strand and is detachably and exchangeably fastened or fastenable to the substructure by means of top strand fastening means and which consists of a conveyor bottom and two substantially T-shaped side profiles, each with a top web, the top strand fastening means comprising screw bolts which can be fixed in place on the substructure. The invention also relates to a changeable trough for a conveyor pan of this type, comprising a conveyor bottom and comprising substantially T-shaped side profiles, each with a top web.

BACKGROUND OF THE INVENTION

In underground mining, the minerals which are won by means of mining machines such as, for example, mining ploughs or drum-cutter loaders, in particular coal, but also ores, potash and the like, are transported by means of scraper chain conveyors, which are made up of a multiplicity of hinge-connected conveyor pans. Since the won material is almost always transported in the top strand, since debris formations can also be permitted there, the top strand is generally prone to substantially greater wear than the bottom strand. It has therefore long been known to use in the conveyor pan a changeable trough, which after excessive wear can be exchanged for a new changeable trough or repaired so that the working life of the substructure can be fully utilized.

The changeable trough can be fastened to the conveyor pan differently, for example by means of clamps secured to the substructure by screw bolts, the clamps applying a clamping force in order to pretension the changeable trough against the substructure so as to prevent vibrations of the changeable trough even in continuous running, which vibrations can cause additional noise loads or an impaired passage of the scrapers of the scraper chain.

SUMMARY OF INVENTION

An object of the invention is to provide a conveyor pan provided with an easily changeable trough which can be fixed securely in place.

This object and others are achieved in terms of the conveyor pan and in terms of the changeable trough by the fact that at least the top web of one of the two side profiles is provided with a plurality of open-edged indentations, in which there are welded holding strips which project laterally partially over the top web and are provided with a plurality of bolt holes for the passage of a plurality of screw bolts. In the conveyor pan according to the invention or a changeable trough according to the invention, the fixing in place is hence realized via a plurality of screw bolts, which pass through bolt holes in holding strips which are welded to the top webs of the side profiles such that they protrude laterally over the top webs. This not only ensures that the screw bolts are easily accessible and can be undone, for example, also by means of electric tools such as electric screwdrivers, but the provision of a plurality of screw bolts also serves to prevent possible vibrations or positional displacements of the changeable trough, as well as thereby induced noise loads, if a single screw bolt comes loose. The provision of a plurality of screw bolts hence simultaneously ensures a redundancy of the top strand fastening means.

In a particularly preferred embodiment of a conveyor pan according to the invention or of a changeable trough according to the invention, both side profiles are provided in the top webs with a plurality of indentations, and the indentations, with the therein fastened, in particular welded-on holding strips, are arranged symmetrical to a centre plane of the changeable trough. This embodiment ensures that, for the installation of the changeable trough, no preferential direction is predefined and, if need be, in the event of increased one-sided wearing of one of the side profiles of the changeable trough, a re-installation or reuse of the changeable trough can be realized by a 180°-rotation of the same, in order to extend the period of use of the conveyor pan. According to a particularly advantageous embodiment, each side profile is provided with two indentations and, correspondingly, two holding strips. Each holding strip can in this case preferably have three to five bolt holes, in particular precisely four bolt holes. Each side profile can hence then be fastened to the substructure by means of eight screw bolts. Further preferably, the holding strip can have for each bolt hole a blind hole recess, in order that, in the assembled state, the heads of the screw bolts lie recessed within the holding strips.

A particularly advantageous embodiment of a conveyor pan is obtained if the conveyor pan can be built into a face conveyor, for which purpose the base elements of a machine guide for a mobile mining machine are connected to one of the side elements of the substructure with the formation of pockets beneath the base elements, into which pockets the holding strips can be inserted. In a corresponding face conveyor, therefore, only on one of the two sides of the changeable trough is it necessary for the latter to be fixed to the substructure by means of the screw bolts, whilst on the opposite, generally substantially less easily accessible side the fixing of the changeable trough on the substructure is realized by positive engagement of the holding strips in corresponding pockets on the substructure. The use of the base elements to form the pocket has the particular advantage that the same conveyor pan, from the point of view of its basic structure, could nonetheless also be used for a gate conveyor with no machine guide, since face and gate conveyors could differ essentially only by the presence or absence of a corresponding machine guide, as well as, where appropriate, of further add-on elements. That side element of the substructure which lies opposite the pockets is preferably provided with a supporting web for the top web of the changeable trough, the supporting web advantageously being able to have a plurality of mutually adjoining passage holes for the screw bolts. Self-evidently, a substructure without pockets must have on both sides appropriate supporting webs with passage holes to allow the changeable trough to be fixed in place on both sides by means of screw bolts. The base elements can, in particular, consist of brackets, to which the pin gear of a drum cutter-loader can be fastened.

In order to relieve the load upon the screw bolt joints, it is particularly advantageous if a shaped plate is welded on beneath the bottom plate of the changeable trough, and in the intermediate floor of the substructure a shaped cavity is formed, into which the shaped plate can at least partially be inserted in a positive-locking manner. Through the interaction of the shaped plate and the shaped cavity, all the forces which arise in the running direction of the scraper chain and which are generated, for example, by the transport of the material and/or the movement of the chain scrapers and scraper chain, can then be passed into the substructure, without the screw joints, or the loose holding strips engaging in the pocket, having to absorb these forces and pass them into the substructure.

Further advantages and embodiments of a conveyor pan according to the invention and of a changeable trough according to the invention emerge from the following description of an illustrative embodiment shown schematically in the drawing. Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
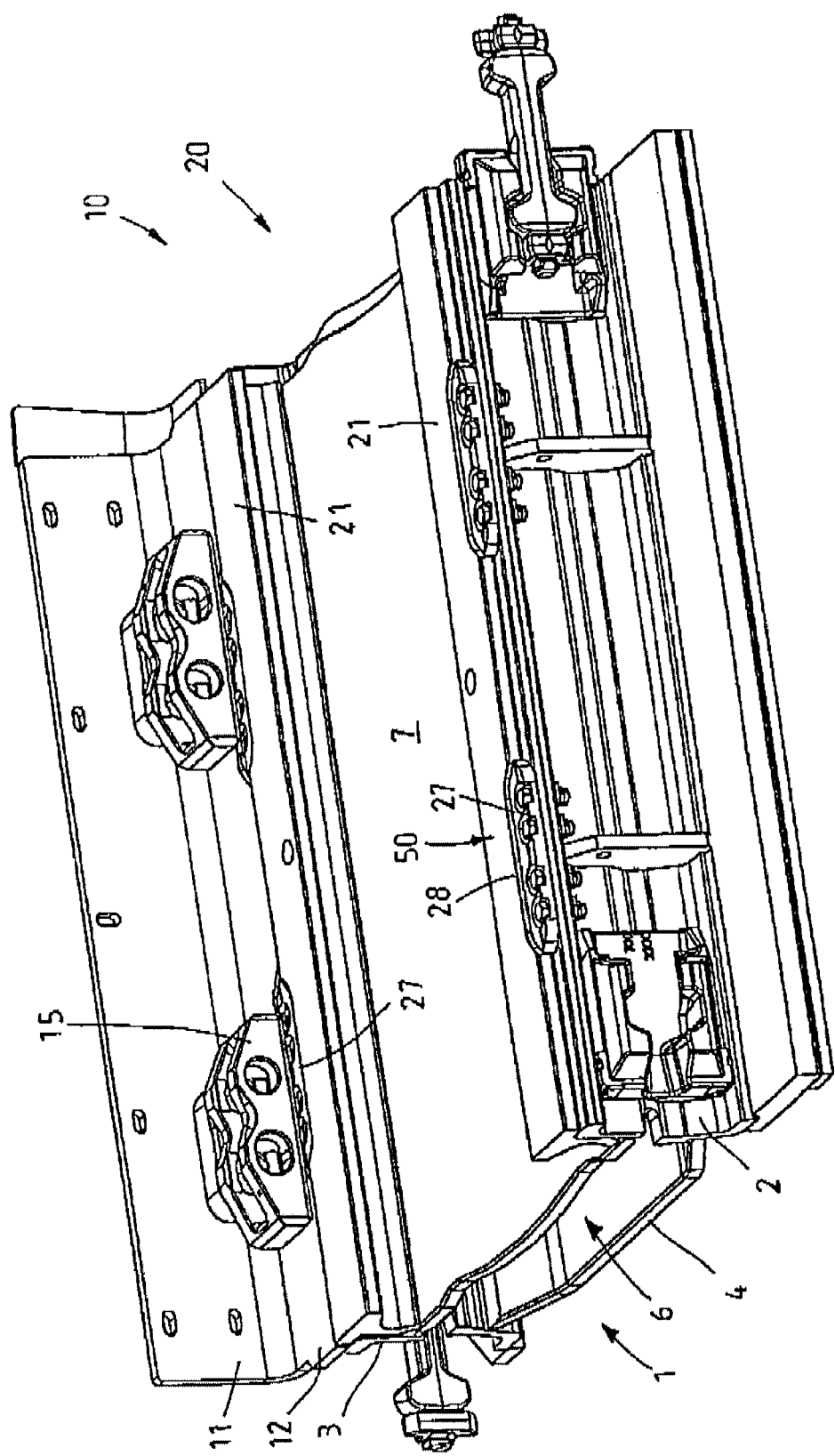
FIG. 1 shows in perspective representation a conveyor pan according to the invention for a face conveyor with fitted changeable trough.

Referring now to the drawings wherein the showings are for the purpose of illustrating preferred and alternative embodiments of the invention only and not for the purpose of limiting same, the figures show a conveyor pan configured as a face conveyor for a drum cutter-loader used as a mining apparatus is indicated in its entirety by the reference symbol 10. With a plurality of identically configured conveyor pans 10, a further face conveyor (not represented) can be formed in order, with a scraper chain (likewise not represented) and the scrapers connected to this scraper chain, to convey minerals won with the drum cutter-loader from the face to a transfer station, at which the minerals are ejected onto a gate conveyor or a belt conveyor, as is known to the person skilled in the art of underground mining and in mineral extraction.

The conveyor pan 10 firstly consists of a substructure 1, which is here realized as a welded construction and comprises, as basic elements, a (in FIGS. 1 to 3) front side element 2, which, in the case of the face conveyor, juts up generally close to the working face and is therefore situated on the working face side, and a stowage-side side element 3, which lies opposite the side element 2 substantially parallel thereto. In the shown illustrative embodiment, the two mutually spaced side elements 2, 3 are welded together on one side by means of a bottom strand floor 4 curved in the shape of a pan, and by means of an intermediate floor 5, both of which floors lie substantially horizontally, to form a virtually rigid substructure 1. The lower portions of the mutually facing inner faces of the side elements 2 and 3 delimit, together with the bottom strand floor 4, a bottom strand denoted in its entirety by 6, via which the scrapers of the scraper chain are returned to one end of the conveyor pan without conveying any materials. The transport of the won mineral, irrespective of whether coal, rock or other minerals, is realized with the scrapers (not shown) in a top strand 7, which in the conveyor pan 10 is formed by a so-called changeable trough 20, which is detachably and exchangeably anchored or anchorable to the substructure 1.

Figure 2:
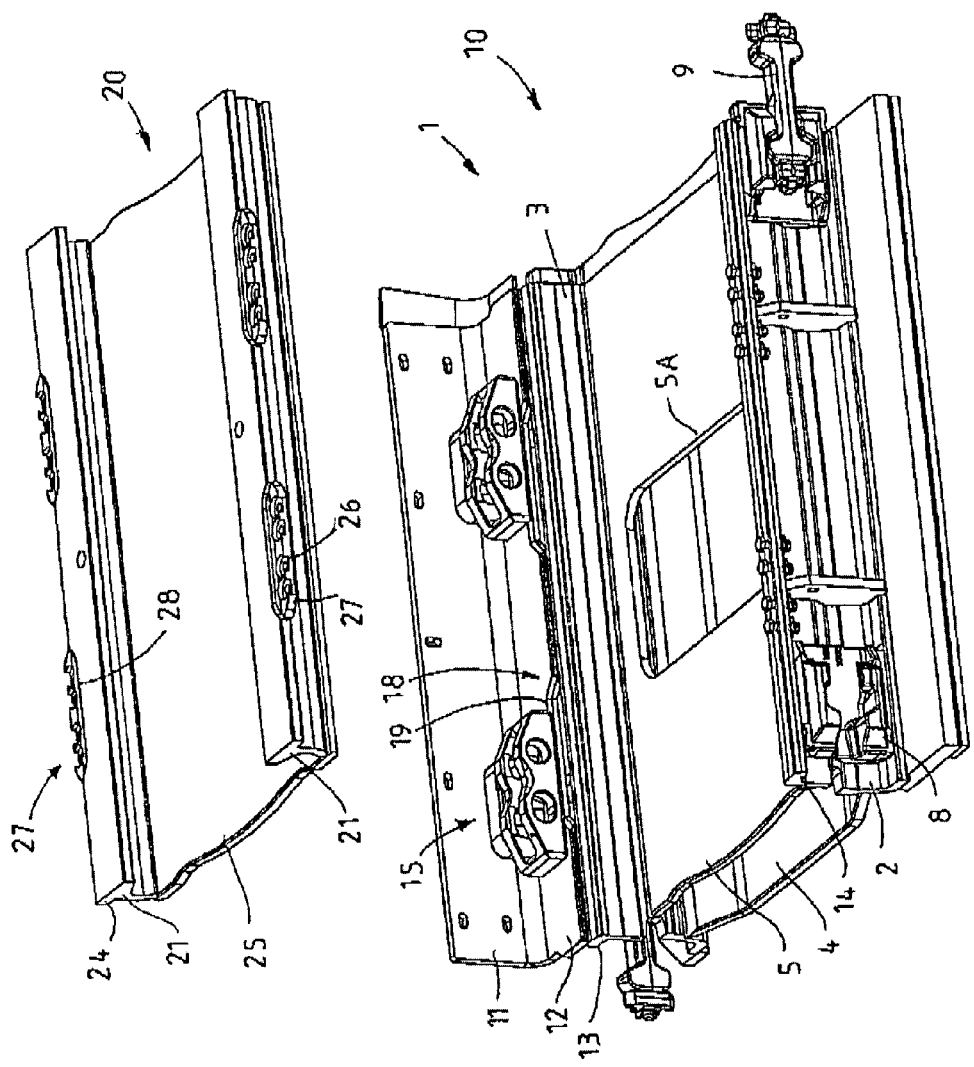
FIG. 2 shows in perspective exploded representation the conveyor pan from FIG. 1, as well as the associated changeable trough.

In a manner which is known per se, toggle pockets 8 are welded onto the outer sides of the side elements 2, 3 of the substructure 1 in order to join together two mutually adjacent conveyor pans 10, by the toggle bolts 9 shown in FIGS. 1 and 2, in such a way as to provide limited angular movement and high tensile strength. Welded onto the stowage-side side element 3, which like the working-face-side side element 2, consists of an approximately C-shaped profiled plate, is an angular bracket plate 11. The bracket plate 11 is supported by its lower arm 12 against the upper, angled-off arm web 13 of the side element 3, which, as will be further explained, forms a stowage-side supporting web for the changeable trough 20. Also the, in the figures, front, working-face-side side element 2 has, at least at the upper end, an angled-off arm web 14, it being particularly advantageous because of the design if the side elements 2 and 3 are of mutually identical configuration and are welded, rotated only by 180°, in the substructure 1. In the shown illustrative embodiment, two brackets 15 are welded onto the arm web 13 of the angle plate 11, which brackets form the base elements for a machine guide and are provided with bolt fixtures to enable a pin gear rod to be fastened in such a way to the base elements 15 that also the pin gear rod permits a limited angular mobility of the conveyor pans 10 relative to each other. For this purpose, one of the bolt holes in the brackets is realized as a horizontal long hole.

Figure 3:
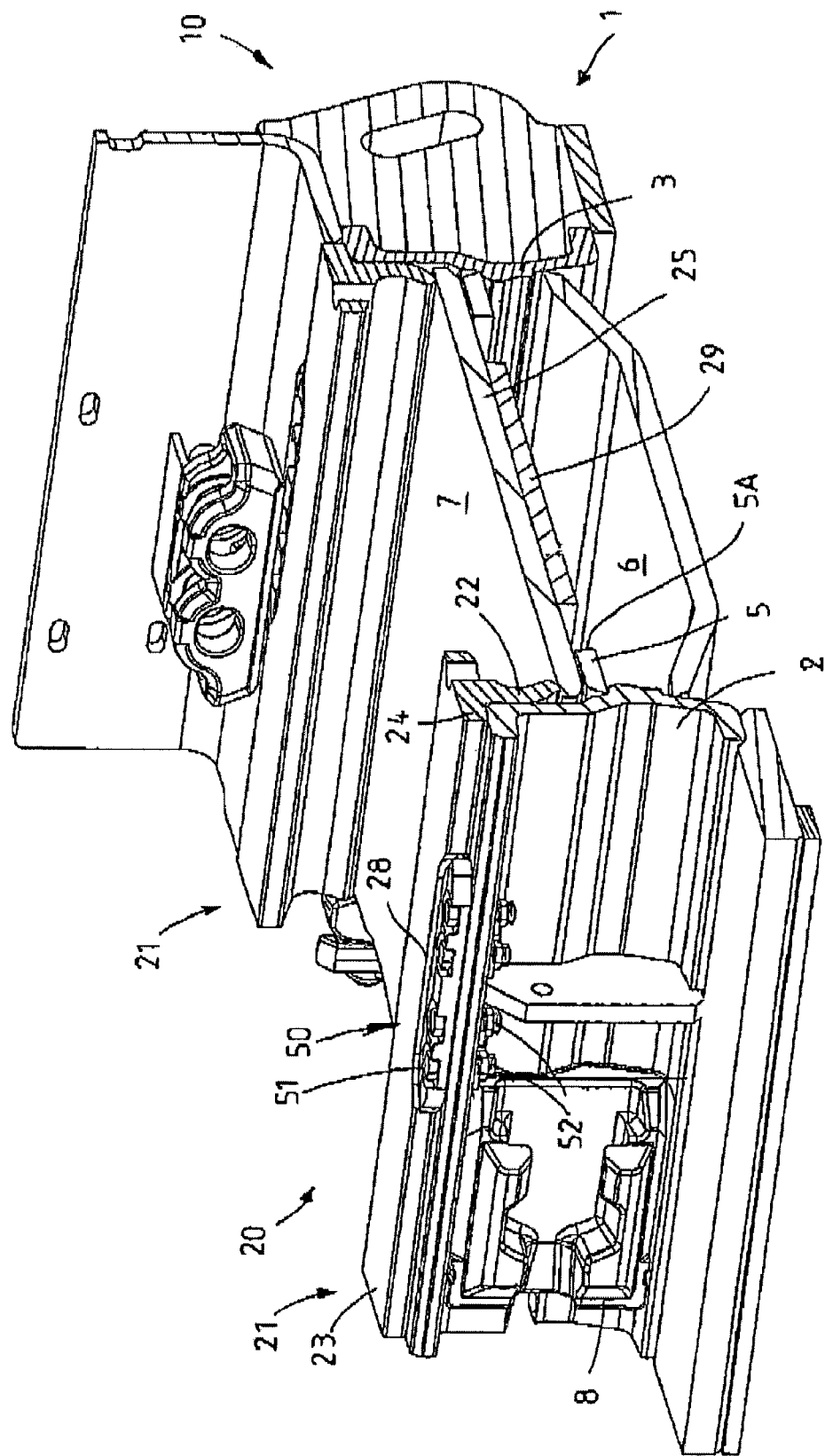
FIG. 3 shows in perspective representation the changeable trough from FIG. 1 in a vertical section through the centre plane.

As can be clearly seen, above all, from FIG. 3, the side elements 2 and 3 have a plurality of offset jumps. The wall portions of the side elements 2, 3 in the lower half have the smallest distance apart and can directly delimit with their inner sides the bottom strand 6 as side walls and guide elements for the scrapers. Above the intermediate floor 5, on the other hand, the clear distance apart of the side elements 2, 3 increases, to enable a changeable trough 20 forming the top strand to be fitted there from above. In the assembled state of the changeable trough 20 on the substructure 1, as shown in FIGS. 1 and 3, two side profiles 21, which form the side boundaries of the changeable trough 20, are substantially T-shaped in cross section and preferably consist of rolled sections, can be positioned with the minimum possible clearance between the two side elements 2, 3 of the substructure 1. The side profiles 21 have a slightly curved middle arm 22 and, in addition, top webs 23, standing substantially vertically to the middle web 22, which, on the one hand, extend inwards into the top strand 7 in order to prevent scrapers which are moved along there from leaving the top strand 7 in the upward direction and, on the other hand, project with a web portion outwards over the middle webs 22. In the figures, the outwardly projecting web portion is respectively denoted by the reference symbol 24. In the assembled state, the changeable trough rests with the projecting web portions 24 of the top web 23 on the supporting sides 13 of the side element 3 and the supporting sides 14 of the side element 2 and, at the same time, a conveyor bottom 25, to which the middle webs 22 of the side profiles 21 are welded, rests on top of the intermediate floor 5 of the substructure 1.

In order to secure this assembly position against release, top strand fastening means 50 are provided, the structure and fitting of which is now described. In the shown illustrative embodiment, the top strand fastening means 50 comprise a plurality of, here precisely two, groups of four screw bolts 51 each, with associated fastening nuts 52. Each screw bolt 51 reaches through, on the one hand, a bolt hole 26 in a holding strip 27, which is welded in an indentation 28 in the web portion 24 of the top web 23 of the side profiles 21 such that each retaining web 28 projects, at least partially, laterally over the outer edge of the top web 23. In the shown illustrative embodiment, the holding strips 27 consist of elongated, narrow plates, which are preferably produced as castings or forgings and which, at the ends, are of oval or multi-bevelled configuration. Each top web 23 of a side profile 21 is provided with two indentations 28, in which a holding strip 27 having four bolt holes 26 is respectively welded. The indentations 28 and the holding strips 27 are positioned such that they lie symmetrical to a centre plane of the changeable trough 20, which coincides with the sectional plane in FIG. 3.

In the shown illustrative embodiment, the fastening of the changeable trough 20 by means of screw bolts 51 is realized, however, only on the working face side, and hence to the side element 2. On the stowage side, on which the brackets 15 are welded, the holding strips 27 engage in pockets 18, which are here respectively delimited in the upward direction by the bottom side of the brackets 15. The side boundary of the pockets 18 is formed by indentations 19 in the arms 12 of the angle plate 11, the contour of the indentation 19 (and also the indentation 28) being matched to the outer contour of the holding strips 27. In order to fit a changeable trough 20 and fix it in place, it is hence sufficient to introduce the holding strips 27 lying on the stowage side, i.e. at the rear in the figures, into the pockets 18, then to lower the changeable trough 20 into its assembly position until it is resting on the substructure 1, and next, on the working face side only, to insert the individual fastening screws 51 for each holding strip and secure them from below by means of nuts 52. In order that the heads of the screw bolts 51 are concealed in the assembled state, each bolt hole 26 in the holding strip 27 is provided with a blind-hole like recess 31, as is clearly shown by FIG. 4.

Figure 4:
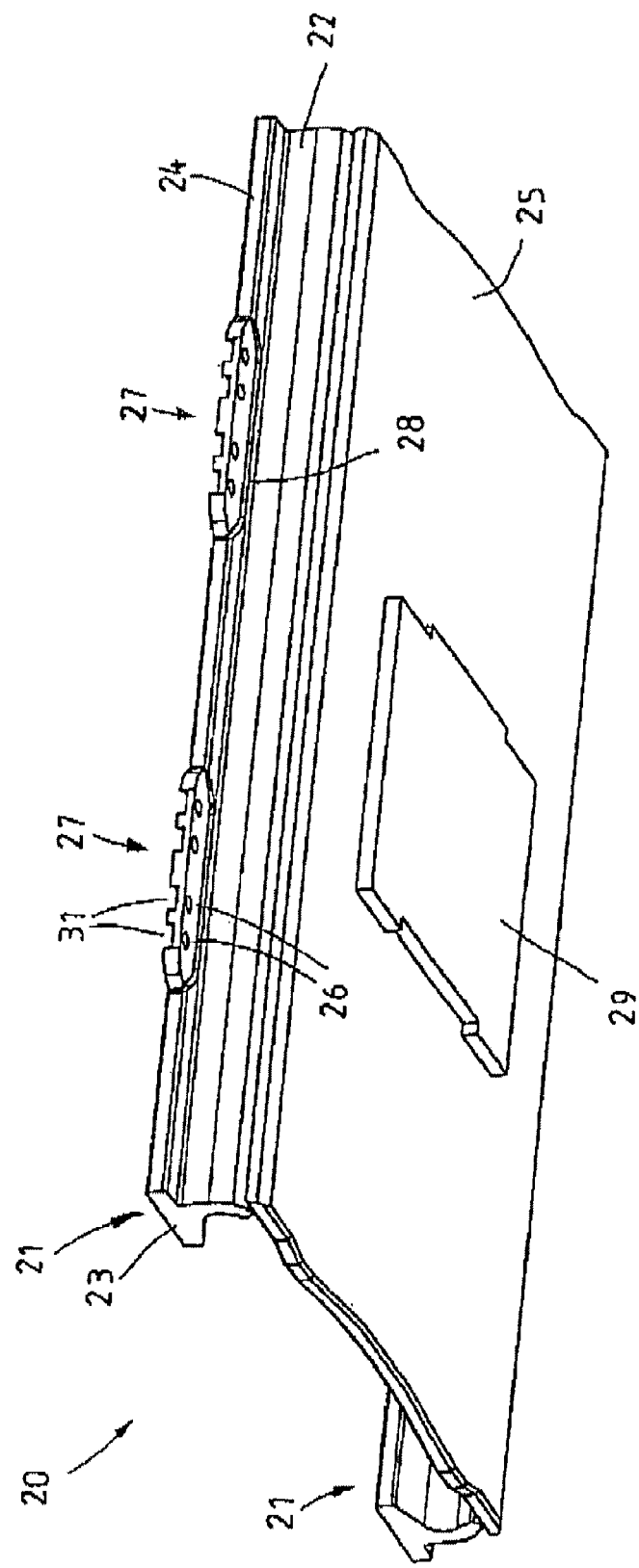
FIG. 4 shows in perspective representation the changeable trough in bottom view.

In order to keep all the fastening screws 51 free from forces in the direction of conveyance or in the running direction of the scraper chain, to the bottom side of the conveyor bottom 25, as is clearly apparent from FIG. 4, there is welded a shaped plate 29, which in the assembled state reaches at least partially, namely in the running direction of the scraper chain, into a shaped cavity 5A in the intermediate floor 5, whereby a thrust in the running direction of the scraper chain, as a result of the positive contact between the shaped plate 29 and the shaped cavity 5A, is passed into the intermediate floor 5.

For the person skilled in the art, the preceding description gives rise to numerous modifications which are intended to fall within the scope of the appended claims. Self-evidently, a changeable trough could also be fastened on both sides by means of screw bolts. The pockets on the stowage-side side element could also be formed directly in the side elements and could there consist of indentations or the like, for example in the supporting web. The pockets could be upwardly delimited instead of by means of the base elements or brackets, also by means of overhanging plates or the like. The illustrative embodiment shows four screw joints per holding strip. The provision of a plurality of screw bolts increases the redundancy of the top strand fastening means. The number could also, however, comprise three or five.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A conveyor pan for a mining apparatus, in particular an underground scraper chain conveyor in the form of a face conveyor or gate conveyor, comprising a substructure having two side elements which are joined together by at least one of an intermediate floor and a bottom strand floor and delimit a bottom strand, and further comprising a changeable trough, which forms a top strand and is detachably and exchangeably fastenable to the substructure by a top strand fastening means and which includes a conveyor bottom and two substantially T-shaped side profiles, each with a top web, the top strand fastening means having screw bolts being fixable in place on the substructure, wherein at least one top web of one side profile is provided with a plurality of open-edged indentations, in which there are holding strips, which project laterally over the top web and are provided with a plurality of bolt holes for the passage of a plurality of screw bolts.

2. A conveyor pan according to claim 1, wherein the holding strips are welded holding strips.

3. A conveyor pan according to claim 1, wherein both side profiles are provided with a plurality of indentations, and the indentations, with the holding strips fastened therein, are arranged symmetrical to a centre plane of the changeable trough.

4. A conveyor pan according to claim 1, wherein each side profile is provided with two indentations and two holding strips.

5. A conveyor pan according to claim 1, wherein the holding strips have three to five bolt holes.

6. A conveyor pan according to claim 1, wherein the holding strips have for each bolt hole a blind hole recess.

7. A conveyor pan according to claim 1, wherein base elements of a machine guide for a mobile mining machine are connected to one of the side elements of the substructure with the formation of pockets beneath the base elements, into which pockets the holding strips can be inserted.

8. A conveyor pan according to claim 7, wherein the base elements include brackets, to which the pin gear of a drum cutter-loader can be fastened.

9. A conveyor pan according to claim 1, wherein at least one of the side elements of the substructure is provided with a supporting web for the top web of the changeable trough, the supporting web having a plurality of mutually adjoining passage holes for the screw bolts.

10. A conveyor pan according to claim 1, wherein a shaped plate is welded on beneath the conveyor bottom of the changeable trough, and in that in the intermediate floor of the substructure a shaped cavity is formed, into which the shaped plate can at least partially be inserted in a positive-locking manner.

11. A changeable trough for a conveyor pan of a mining apparatus, in particular an underground scraper chain conveyor in the form of a face conveyor or gate conveyor, comprising a conveyor bottom and comprising substantially T-shaped side profiles, each with a top web, wherein at least one top web of one side profile is provided with a plurality of open-edged indentations, in which there are holding strips, which project laterally over the top web and are provided with a plurality of bolt holes for the passage of a plurality of screw bolts.

12. A changeable trough according to claim 11, wherein the holding strips are welded holding strips.

13. A changeable trough according to claim 11, wherein both side profiles are provided with a plurality of indentations, and the indentations, with the holding strips fastened therein, are arranged symmetrical to a centre plane of the changeable trough.

14. A changeable trough according to claim 11, wherein each side profile is provided with two indentations and two holding strips.

15. A changeable trough according to claim 11, wherein the holding strips have three to five bolt holes.

16. A changeable trough according to claim 11, wherein the holding strips have for each bolt hole a blind hole recess.

17. A changeable trough according to claim 11, wherein the conveyor pan includes base elements of a machine guide for a mobile mining machine are connected to one of side elements of a substructure with the formation of pockets beneath the base elements, into which pockets the holding strips can be inserted.

18. A changeable trough according to claim 17, wherein the base elements consist of brackets, to which the pin gear of a drum cutter-loader can be fastened.

19. A changeable trough according to claim 11, wherein the conveyor pan further includes a substructure having two side elements which are joined together by at least one of an intermediate floor and a bottom strand floor and delimit a bottom strand, at least one of the side elements of the substructure is provided with a supporting web for the top web of the changeable trough, the supporting web having a plurality of mutually adjoining passage holes for the screw bolts.

20. Conveyor pan according to claim 19, wherein a shaped plate is welded on beneath the conveyor bottom of the changeable trough, and in that in the intermediate floor of the substructure a shaped cavity is formed, into which the shaped plate can at least partially be inserted in a positive-locking manner.

* * * * *